United States Patent [19]

Seki et al.

[11] Patent Number: 5,128,840
[45] Date of Patent: Jul. 7, 1992

[54] BICYCLE LUMINAIRE

[76] Inventors: Hiroshi Seki, 2265, Kamihongo, Matsudo-shi, Chiba-ken; Kazunari Maeda, 483, Higashi-iru-Aizenji-cho, Kamikyo-ku, Kyoto, both of Japan

[21] Appl. No.: 548,862

[22] Filed: Jul. 6, 1990

[30] Foreign Application Priority Data

Jul. 12, 1989 [JP] Japan .................. 1-179735
Jul. 13, 1989 [JP] Japan .................. 1-181608

[51] Int. Cl.$^5$ .................. B62J 6/00; F21V 33/00
[52] U.S. Cl. .................. 362/72; 362/78
[58] Field of Search .................. 362/72, 78

[56] References Cited

U.S. PATENT DOCUMENTS 2,083,514  6/1937  Brown .................. 362/78
4,191,988  3/1980  Kumakura .................. 362/72
4,225,848  9/1980  Roberts .................. 362/72 X

OTHER PUBLICATIONS

Bulletin No. 103A, "Wiegand Effect Transducers", published by Sensor Engineering Co., U.S.A.

Primary Examiner—Allen M. Ostrager
Attorney, Agent, or Firm—Fleit, Jacobson, Cohn, Price, Holman & Stern

[57] ABSTRACT

A bicycle luminaire has first permanent magnets on spokes of a bicycle wheel, and a detection unit fixed to a stationary portion of the bicycle. The detection unit has a second permanent magnet, a Wiegand wire and a sensing coil. In place of the first magnets, Wiegand wires can be disposed on the spokes, and the detection unit can be formed with two magnets and sensing coil.

4 Claims, 4 Drawing Sheets

BICYCLE LUMINAIRE

BACKGROUND OF THE INVENTION

The present invention relates to a luminaire for a bicycle and more particularly to a bicycle light fitting which does not require any frictional engagement with a wheel tire and use of any storage batteries.

Conventionally, a luminaire or light fitting for bicycles has an unipolar electric generator having a rotary shaft adapted to be frictionally engaged with a side of the wheel tire so that a rotational energy of the rotary shaft by rotation of the wheel is converted to an electric energy to light a bulb of the luminair. This light fitting has long been used as it can be made simple. However, it is troublesome to operate the rotary shaft to be releasably frictionally engaged with the tire. Moreover, the conventional light fitting requires another manpower for driving the rotary shaft with additional load by rotating the bicycle wheel in addition to the power required for simply driving the bicycle, and troublesome maintenance and repairement of brushes in the generator are needed. Further, the frictional engagement of the rotary shaft with the tire results in wearing of the tire and produces an unfavorable noise. In order to avoid such disadvantages as described, an attempt has been made to use dry cells as developments in the life of the dry cells, but the light fitting using dry cells still has a serious porblem of the limited life of the dry cells and troublesome manipulation for changing them with new ones.

Wiegand effect technology exploits magnetic properties of specially processed, small diameter ferromagnetic wire, which is nominally 15-30 mm in length, and diameter of about 0.25 mm. The wire, generally of iron-cobalt-vanadium composition, is cold-worked and tempered according to a process developed by John R. Wiegand. Transducers utilizing this effect require a few simple components to produce sharply defined voltage pulses in responses to changes in the applied magnetic field. In the simplest form, transducers consists of a short length of Wiegand wire, a sensing coil and actuating magnetic fields that generally are derived from relatively small permanent magnets.

Processed Wiegand wire has a permanently work-hardened surface, that is, a shell, and a relatively soft inner core. The shell exhibits high magnetic coercivity and, therefore, requires a strong magnetic field to change its direction of longitudinal magnetization. The core has low coercivity, and its direction of magnetization can be changed easily without affecting the magnetic polarity of the shell. By properly manipulating external magnetic field excursions, the core and the shell can be switched to the same or opposite state of magnetic polarity. The polarity switching occurs abruptly and therefore this provides the so called Wiegand effect.

It is known that the Wiegand wire in combination with a permanent magnet and a detection coil can generate a relatively large electric pulses by utilization of the Wiegand effect. A switching operation mode will be explained with reference to FIGS. 4A, 4B and 4C. The Wiegand wire has a shell 1 and a core 2. In the drawing, reference numeral 3 represents a magnetic field of the Wiegand wire. FIG. 4A shows a state in which the Wiegand wire is magnetized in one direction at the shell and the core by a magnet (not shown) of a strong saturation flux density. FIG. 4B shows a state in which the magnetization in the core 2 only is reversed by a reset magnet of a relatively weak magnetic field, and FIG. 4C shows a state in which the first-mentioned magnet of a strong saturation flux density is again applied to thereby cause the magnetization state of the core to be returned to the initial state of magnetization.

In FIG. 5 which shows output pulses induced to a sensing coil (not shown) disposed adjacent to the Wiegand wire. Negative pulses shown by reference numeral 4 are generated at the state shown in FIG. 4B in which the magnetization polarity in the core is switched. The core 2 and the shell 1 are mutually affected to each other in respect of their magnetic fields to generate a relatively slow change in the magnetic polarity and consequently a relatively slow change in magnitude of the voltage pulse generated by the sensing coil is proportional to the change of magnetic flux by time. Consequently, the slow change in magnetic flux as described above will induce a relatively small electric voltage in the sensing coil. Positive pulses 5 are generated at the state of FIG. 4C. In this state, the core 2 and the shell 1 are magnetically affected to each other to produce a relatively rapid change in magnetic polarity and consequently a large voltage pulse is induced in the sensing coil.

SUMMARY OF THE INVENTION

An object of the present invention is to provide a new bicycle luminaire which requires no frictional engagement with a tire of a bicycle wheel.

Another object of the present invention is to provide a new bicycle luminaire which can be operated without requiring additional manpower than the manpower for driving the bicycle.

Another object of the present invention is to provide a new bicycle luminaire which can be operated without any manual operation of engagement and disengagement of a rotary shaft of a generator with respect to the tire of the bicycle wheel.

A further object of the present invention is to provide a maintenance-free luminaire for a bicycle.

According to the present invention, there is provided a bicycle luminaire comprising a plurality of first permanent magnets fixed to rotary portions such as spokes or a hub portion of a bicycle wheel, a detection unit fixed to a stationary portion of the bicycle. In an embodiment of the invention, the detection unit has a second permanent magnet, a Wiegand wire and a sensing coil.

In another embodiment of the present invention, the Wiegand wires are disposed on the spokes of the bicycle and a detection unit having two permanent magnets in a spaced relation and a sensing coil is fixed to a stationary portion of the bicycle.

In the present invention, when the bicycle wheel is rotated an electric voltage is induced in the sensing coil and then charged in a storage circuit. The charged voltage is smoothed to light a bulb of the luminaire.

PREFERRED EMBODIMENT OF THE INVENTION

Figure 1A:
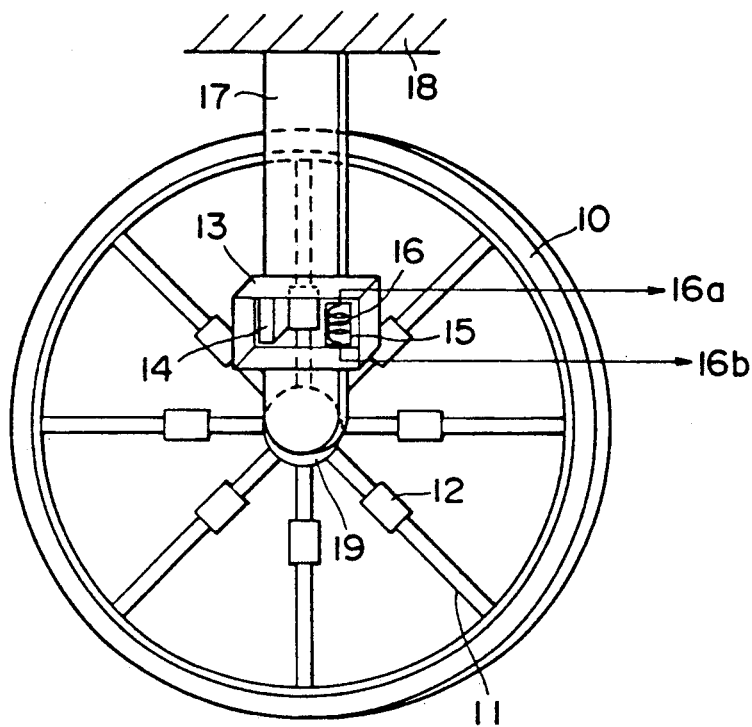
FIG. 1A is an explanatory diagram of a bicycle luminaire of the present invention, showing that permanent magnets are fixed to spokes of the bicycle wheel.
Figure 2:
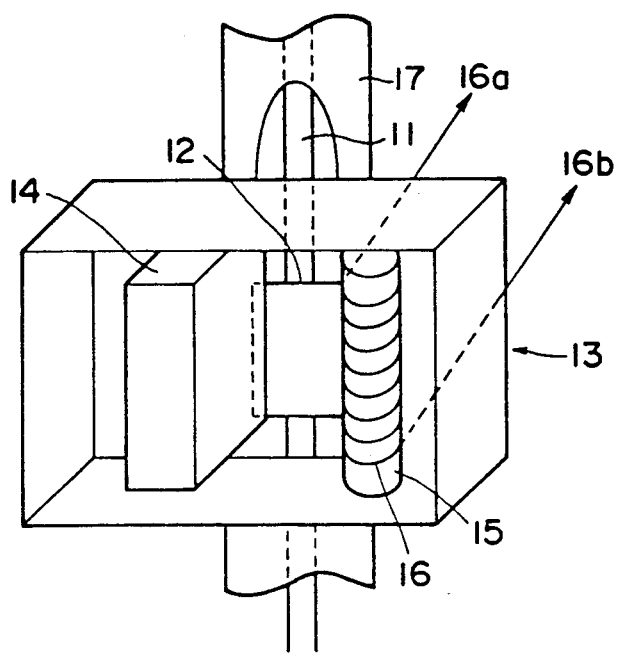
FIG. 2 is an enlarged perspective view of a detection unit which has a permanent magnet, a Wiegand wire and a sensign coil.

Referring first to FIG. 1A showing a bicycle wheel which has a hub 19 and spokes 11 extending radially outwardly from the hub to a rim of the wheel, a plurality of permanent magnets 12 are fixed to the spokes by a suitable fixing means such as an adhesive agent. A detection unit 13 is fixed to a stationary portion, such as a frame pipe, of the bicycle. The detection unit 13 has a permanent magnet 14, a Wiegand wire 15 and a sensing coil 16, as shown in FIG. 2.

The permanent magnet 14 in the detection unit 13 has a stronger magnetic field than the other permanent magnets 12 fixed to the spokes 11 and is used as a saturation magnet, and the other magnets 12 on the spokes are reversed in their magnetic polarity for use as a reset magnet. The permanent magnets 12 on the spokes 11 are located closer to the sensing coil 16 in the detection unit 13 fixed to the stationary portion of the bicylcle. The sensing coil 16 provides outputs 16a, 16b.

Figure 3A:
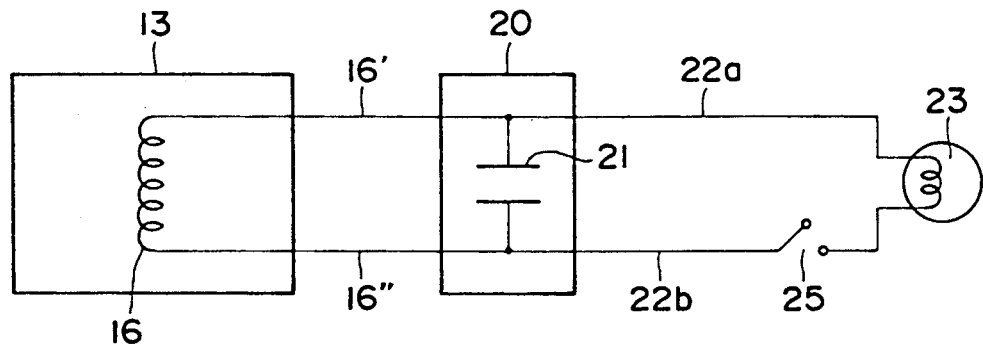
FIG. 3A is a circuit diagram showing the bicycle luminaire according to the present invention.

In FIG. 3A, a storage ciucuit 20 has a capacitor 21 and is connected to a bulb 23 through lines 22a, 22b so that the outputs 16a, 16b from the sensing coil 16 are fed to the bulb 23 via the storage circuit 20. The storage circuit 20 may be incorporated to the detection unit 13 in a unitary structure. Reference numeral 25 represents a switch which may be a general ON/OFF switch or any other switch such as a photo-sensor switch.

Figure 1B:
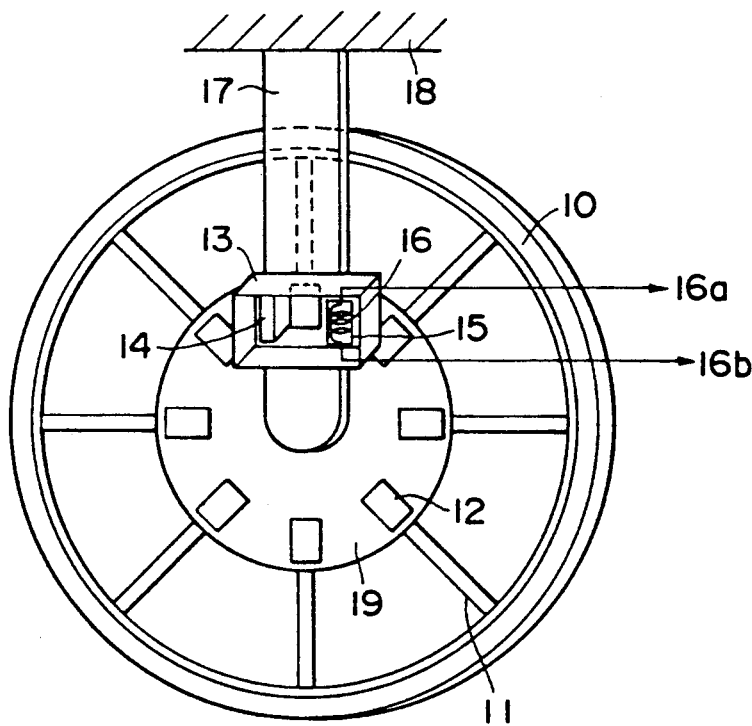
FIG. 1B is, similar to FIG. 1A, is a diagram of a bicycle luminaire of the present invention, showing that permanent magnets are fixed to a hub portion of the bicycle wheel.
Figure 3B:
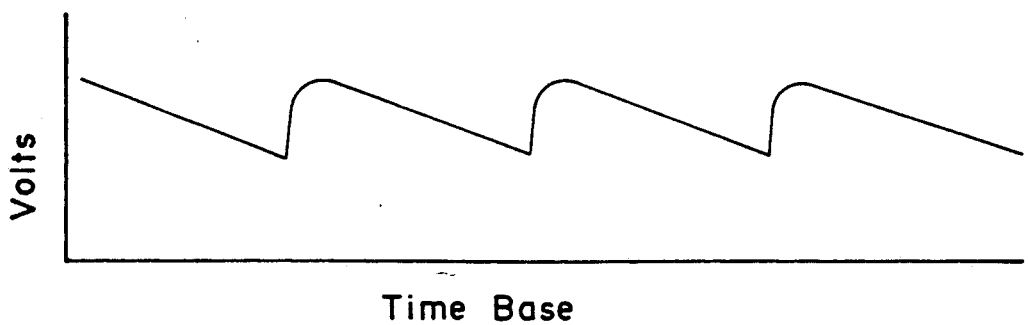
FIG. 3B is a diagram showing an output waveform which has been smoothed by a storage ciucuit shown in FIG. 3A, FIGS. 4A, 4B and 4C are diagrams showing driving modes of a Wiegand wire in the asymmetric switching, wherein a saturating positive field first magnetizes the Weigand wire core and shell in one direction(FIG. 4A), and then a less-powerful field of the opposite polarity switches the core polarity but not the shell(FIG. 4B), and the saturating field is reintroduced and switches the core back to this original orientation giving rise to a jump in magnetization that produces a large positive voltage in the sensing coil(FIG. 4C)
Figure 4A:
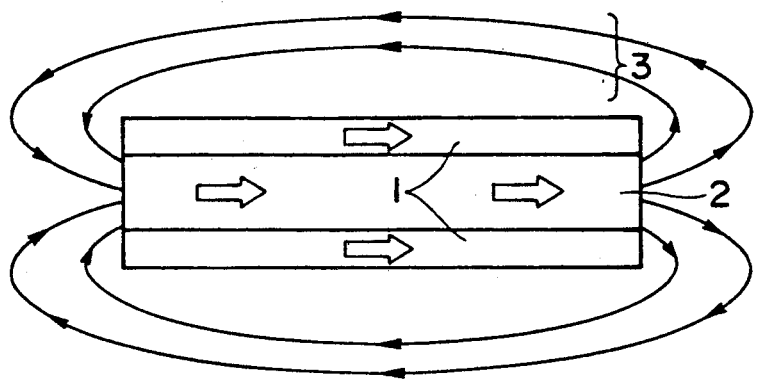
Figure 4B:
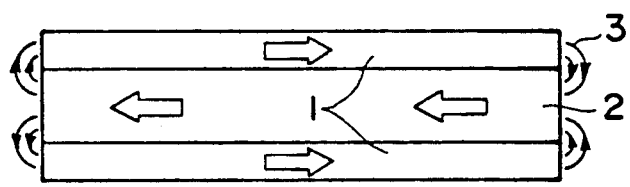
Figure 4C:
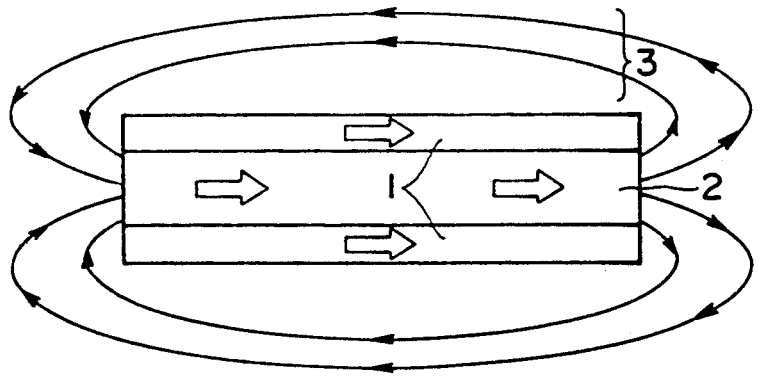
Figure 5:
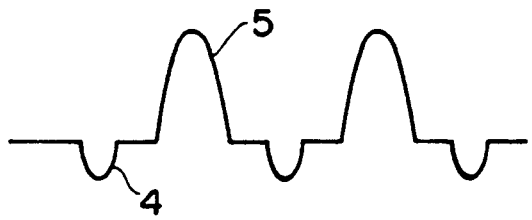
FIG. 5 is a diagram showing a waveform of output pulses.

When the wheel of the bicycle is rotated, the permanent magnets fixed to the spokes are rotated along with the spokes relative to the fixed detection unit 13 and generate an outputs which is fed through lines 22a, 22b by the coaction with the magnet 14, Wiegand wire 15 and the sensing coil 16 of the detection unit 13. The output is smoothed as shown in FIG. 3B by means of the storage circuit in FIG. 3A. The permanent magnet 12 on the spoke can be fixed to the hub 19, if desired, in a spaced radial configuration as shown in FIG. 1B. Further, the permanet magnet 12 can be omitted by magnetizing the spokes.

Figure 6:
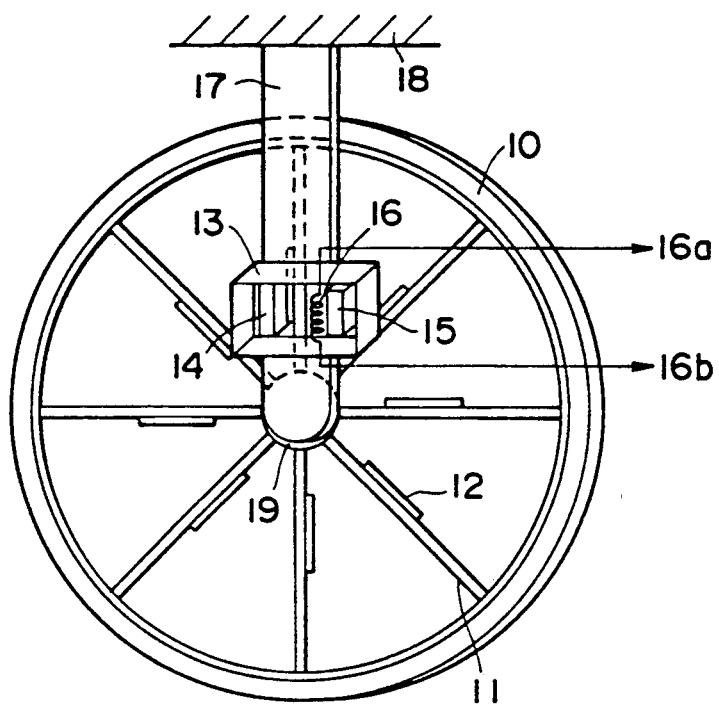
FIG. 6 is a diagram showing a bicycle luminaire according to another embodiment of the invention.
Figure 7:
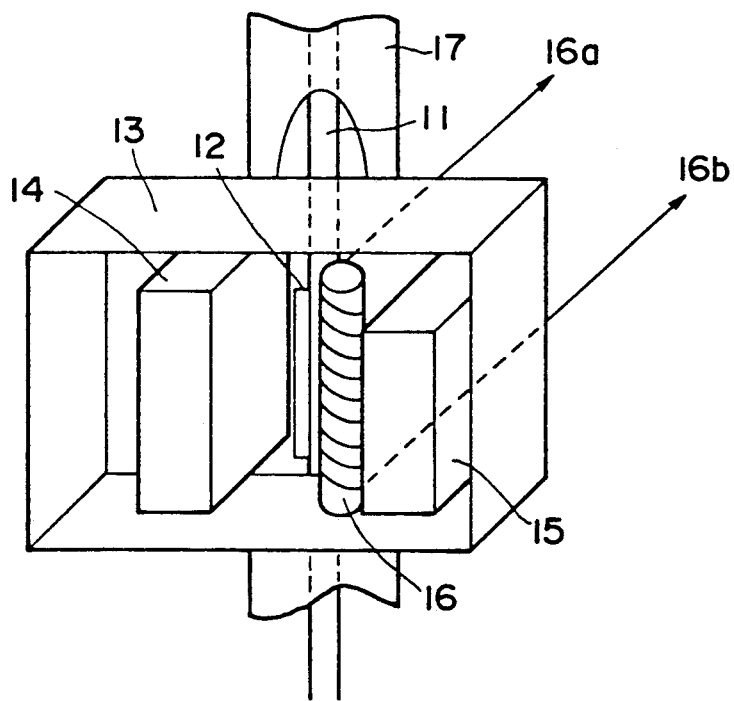
FIG. 7 is an enlarged perspective view of a detection unit according to the embodiment shown in FIG. 6.

In FIGS. 6 and 7 showing another embodiment of the invention, Wiegand wires 12 are disposed on the spokes 11 and the detection unit 13 has therein permanent magnets 14, 15 in spaced relation and a sensing coil 16. The Wiegand wire 12 is closely positioned to the sensing coil 16.

What is claimed is:

1. A bicycle luminaire comprising a plurality of first permanent magnets fixed to a rotary portion of a bicycle wheel, and a detection unit fixed to a stationary portion of the bicycle, wherein said detection unit has a second permanent magnet, a Wiegand wire and a sensing coil, the luminaire further including a light bulb and an electric circuit connecting the light bulb to the sensing coil for supplying electricity to the bulb by receiving electrical pulses from the coil produced by movement of the first magnets past the second magnet and the Wiegand wire.

2. A bicycle luminaire according to claim 1, wherein said first permanet magnets are fixed to spokes of the wheel.

3. A bicycle luminaire according to claim 1, wherein said permanent magnets are fixed to a hub of the wheel in a spaced radial configuration.

4. A bicycle luminaire comprising a plurality of Wiegand wires attached to spokes of a bicycle wheel, and a detection unit fixed to a stationary portion of the bicycle, wherein said detection unit has a first permanent magnet and a second permanent magnet in a spaced relation to said first permanent magnet, and a sensing coil adjacent to one of the first and second permanent magnets, the luminaire further including a light bulb and an electric circuit connecting the light bulb to the sensing coil for supplying electricity to the bulb by receiving electrical pulses from the coil produced by movement of the Wiegand wires past the permanent magnets.

* * * * *